Jan. 6, 1931.  H. F. WATERS ET AL  1,787,559
MAGNETIC ACTION FOR PIPE ORGANS
Filed Oct. 17, 1928
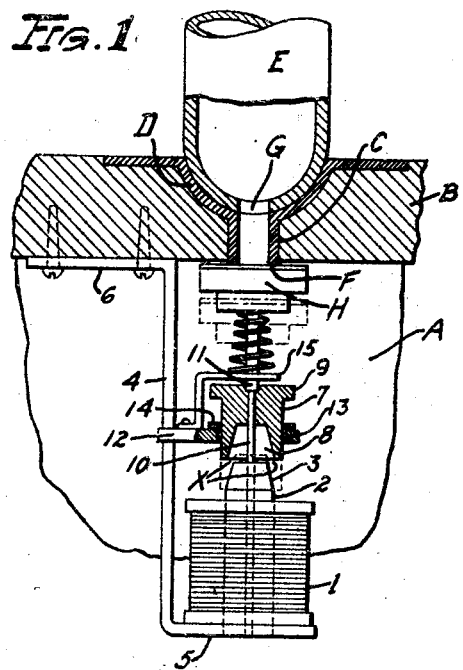
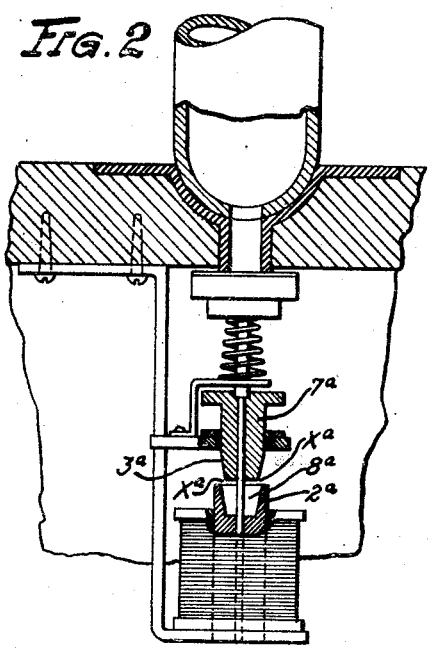
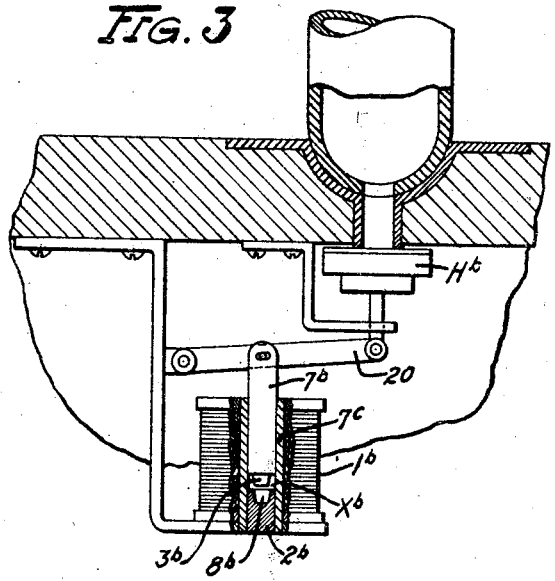
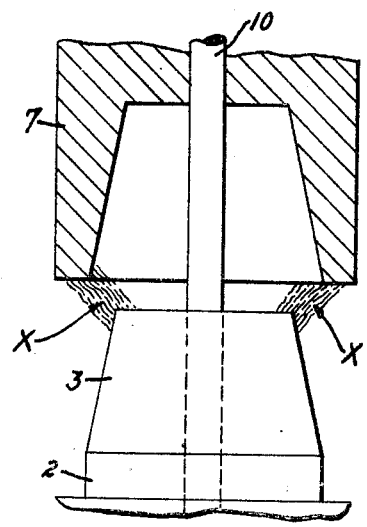
INVENTORS
H. F. WATERS
V. R. BROWN
BY E. M. Harrington
ATTORNEY Patented Jan. 6, 1931

1,787,559

UNITED STATES PATENT OFFICE

HARRY F. WATERS, OF ST. LOUIS, AND VERNIE ROY BROWN, OF UNIVERSITY CITY, MISSOURI, ASSIGNORS TO MAGNETIC ORGAN ACTION COMPANY, OF UNIVERSITY CITY, MISSOURI, A CORPORATION OF MISSOURI

MAGNETIC ACTION FOR PIPE ORGANS

Application filed October 17, 1928. Serial No. 312,987.

This invention relates generally to improvements in magnetic devices for imparting movement to movable parts of pipe organs, and particularly to devices of this type which are provided with stationary elements in the nature of cores with which movable, magnetically influenced, elements are arranged to move in telescoping relation on energization of said devices.

Much experimentation has been carried on recently in efforts to produce magnetic actions which will function efficiently in actuating movable parts of pipe organs and because such a device must necessarily produce movement of substantial extent while consuming the minimum amount of electrical energy the solution of the problem has not been at all simple. We have discovered however, that an electro-magnet or a solenoid which will function with a very high degree of efficiency for this purpose may be produced when the movable, magnetically influenced, element of the device is arranged for telescoping movement with respect to the fixed magnetized element by which said movable element is influenced. By this arrangement the air gap ordinarily present in devices of this type between the movable, magnetically influenced, element and the fixed element by which said movable element is influenced is greatly reduced in extent whereby current consumption of the device is maintained at the minimum and at the same time the telescoping arrangement of the elements referred to provides for a stroke of the movable element which is of substantial extent.

Prior to this invention, solenoids have been produced which included a fixed core with a portion of which a movable, magnetically influenced, element moved in telescoping relation. The telescoping portions of the fixed and movable elements of the solenoids referred to comprised a conical portion on one of said elements and a conical shaped recess formed in the other of said elements into which said conical portion moved, and it has been found in the use of a solenoid so constructed because of the shape of the telescoping portion and recess that the air seal between the fixed core and the movable element is broken with difficulty. This difficulty results from the fact that the magnetism by which the movable element is attracted, is distributed along the entire conical face of the fixed core and therefore there is a no concentration of magnetism at a particular point which would cause the maximum attraction to be exerted against the movable element to break the air seal.

In accordance with the arrangement disclosed in the present application, the telescoping portion and recess of the fixed and movable elements are so shaped that there is a concentration of magnetism at a certain point whereby the maximum power is exerted at the very beginning of the stroke of the movable element so that the air seal between said elements is effectively broken.

Fig. 1 illustrates a magnetic organ action constructed in accordance with our invention.

Fig. 2 illustrates another form of the invention.

Fig. 3 illustrates still another form of the invention.

Fig. 4 is a fragmentary diagrammatical view illustrating the operation of the invention.

In Fig. 1 of the drawing, which illustrates one embodiment of the invention, A designates the wind-chest of a pipe organ and B designates the top wall of said wind-chest which is provided with an opening C. D designates a seat for an organ pipe E, which seat preferably includes a tubular portion which extends slightly below the lower face of the top wall of the wind-chest to provide a valve seat F. The toe portion of the organ pipe E is provided with an orifice G arranged in registration with the passageway through the tubular portion of the seat D, whereby air may pass into the pipe from the wind-chest to cause the pipe to speak.

1 designates a single pole electro-magnet which is provided with a stationary core 2 formed of suitable magnetic material and having an opening formed longitudinally therethrough. The upper portion of the core 2 is extended above the top face of the magnet and said upper portion of said core is tapered to a smaller diameter at the upper edge of the core as indicated at the point designated by the reference character 3.

4 designates a support for the electro-magnet 1, said support comprising a strip of magnetic material having a portion 5 at its lower end extended at an approximate right angle to the main or vertical portion of the support. The electro-magnet 1 is secured to the portion 5 of the support 4 in any suitable manner, the lower end portion of the core 2 preferably being extended through an aperture formed through said portion 5 of said support. The core and the portion 5 of the support are intimately connected together so that magnetism will pass from one to the other of said elements. At the upper end of the support 4 the strip of material comprising same is provided with a portion 6 which is arranged at an approximate right angle to the main or vertical portion of said support and said portion 6 preferably extends in the opposite direction to that in which the portion 5 extends. The support 4 is secured to the top wall of the wind-chest by fastening devices which pass through apertures formed in the portion 6 thereof.

Arranged immediately above the upper end of the core 2 of the electro-magnet is the armature 7 of the improved action. The particular armature illustrated in Fig. 1 is provided with a recess 8 which corresponds approximately in shape with the shape of the tapered upper portion of the core 2. Also the armature 7 is provided with an outwardly extended, annular flange 9 which is located at the upper face of said armature. 10 designates a rod, formed of brass, or other non-magnetic material, which is secured to the armature 7 by having its upper end driven into an opening formed in the armature. The lower end portion of the rod 10 is extended into the longitudinal opening formed through the core 2 to aid in guiding the armature 7 during movement thereof. Extended upwardly from the armature 7 is a second rod 11 which is rigidly fixed to said armature by having its lower end driven into an opening formed in the armature. As shown in Fig. 1, the rods 10 and 11 are alined with each other, and the ends thereof which are located within the openings formed in the armature abut against each other.

Mounted on the rod 11 at the upper end thereof is an air valve H, said air valve being adapted to be seated against the valve seat F to control the passage of air from the air chest A into the pipe E. The air valve H may be of the usual construction common to air valves of pipe organs.

Extended outwardly from the support 4, is an arm 12, said arm being formed of suitable magnetic material and being rigidly fixed in any suitable manner to the vertical portion of said support. The connection between the arm 12 and the support 4 is such that magnetism will pass from one of said elements to the other thereof when the electro-magnet 1 is energized. The arm 12 is provided adjacent to its outer end with an opening 13 through which the armature 7 extends, said opening being of such diameter that the armature may move longitudinally of its major axis through said opening when the electro-magnet is energized or de-energized. When the electro-magnet 1 is in a de-energized condition, the annular flange 9 on the armature is alined vertically with the outer portion of the arm 12 and said flange is spaced apart in an upward direction from said outer portion of said arm. 14 designates a washer of felt or other suitable soft material, which acts as a buffer or silencer, said washer being arranged in contact with the arm 12 in such position that same will be struck by the flange 9 of the armature 7 when said armature is drawn downwardly by the electro-magnet 1, whereby noise which which would otherwise result from contact of the flange 9 with the arm 12 is eliminated. 15 designates a guide arm which is preferably fixed to the arm 12, said guide arm being provided with an opening formed therethrough at a point adjacent to its outer end through which the rod 11 extends. The guide arm 15 aids in guiding the vertical movement of the armature and the associated elements which move therewith. 16 designates a coil spring which surrounds the rod 11 and is interposed between the arm 15 and the air valve H, said coil spring tending to force said air valve upwardly into close contact with the valve seat F.

In the operation of the form of the invention shown in Fig. 1 of the drawing, energization of the electro-magnet 1 caused by depression of the associated organ key, or otherwise, and the consequent completion of the electrical circuit leading to the electro-magnet will result in the armature 6 being drawn downwardly into the position in which said armature is shown by dotted lines in Fig. 1. This movement of the armature will draw the air valve H away from the valve seat F thus permitting air to pass from the wind-chest A into the pipe E whereby said pipe will be caused to speak.

As already stated, solenoids have been produced heretofore having fixed cores and movable elements arranged to be attracted by said fixed cores, which fixed cores and movable elements were arranged for telescoping movement with respect to each other. The telescoping portion of the fixed cores and movable elements of the solenoids referred to comprised conical portions and conical recesses and it has been found in the operation of such devices that the magnetism is so distributed along the entire conical faces of the telescoping portions and walls of the co-operating recesses that concentration of the magnetism is prevented, hence difficulty is encountered in breaking the air seal between the fixed cores and the movable elements. In connection with the present invention, however, the telescoping portions of the fixed core and the movable element are so shaped that concentration of magnetism occurs at the point indicated by the reference character X in Figs. 1 and 4 and because this concentration of magnetism takes place immediately upon energization of the electro-magnet the air seal between the fixed core and the movable element of the device is quickly broken and the movable element drawn downwardly. It will be noted that at the point X referred to, the fixed core 2 and the movable element 7 are relatively close together hence movement will be imparted to the movable element with the minimum consumption of electrical energy.

In the form of the invention illustrated in Fig. 2, the core 2a, instead of being provided with a tapered portion as in Fig. 1, is provided with a recess 8a having a tapered side wall. Likewise in this form of the invention, the armature 7a is not provided with a recess as in Fig. 2 but is provided at its lower end with a tapered portion 3a shaped to move downwardly into the recess 8a when the armature 7a is attracted by the magnetized core 2a. Aside from the changes indicated above, the form of the invention shown in Fig. 2 is constructed just as is the form of the invention shown in Fig. 1. Also the form of the invention shown in Fig. 2, operates the same as the form of the invention shown in Fig. 1, magnetism being concentrated at the point designated by the reference character Xa in Fig. 2 to effectively and quickly break the air seal between the fixed core 2a and the armature 7a.

In Fig. 3 we illustrate our invention embodied in a solenoid comprising a coil 1a having a fixed core 2b. 7b designates a movable element which is movable within the tubular member 7c, said member in the embodiment of the invention shown being connected to a pivoted arm 20 which arm in turn has an air valve Hb connected to its outer end. The fixed core 2b is provided with a tapered recess 8b into which a tapered portion 3b on the movable element 7b is adapted to move. The operation of the form of the invention shown in Fig. 3 is the same as the operation of the forms of the invention shown in Figs. 1 and 2, magnetism being conducted at the point designated by the reference character Xb on energization of the solenoid to quickly and effectively break the air seal between the fixed core 2b and the movable element 7b.

While the telescoping portions and recesses of the fixed core and the movable element of our improved device are approximately the shape of a frustum, we do not wish to be limited to this precise shape, as these parts may be a great variety of shapes other than that shown in the drawing.

We claim:

1. A device for actuating movable parts of pipe organs comprising an electro-magnetic element provided with a fixed member extended outwardly beyond the electro-magnetic element and adapted to be magnetized on energization of the electro-magnetic element, a movable member located wholly outside of said electro-magnetic element and arranged to be attracted by said fixed member when same is magnetized, one of said members being provided with a recess into which a portion of the other member is extended when said movable member is actuated, the shape of the last mentioned portion being defined by lines, one of which crosses the major axis of said portion.

2. A device for actuating movable parts of pipe organs comprising an electro-magnetic element provided with a fixed member extended outwardly beyond the electro-magnetic element and adapted to be magnetized on energization of the electro-magnetic element, a movable member located wholly outside of said electro-magnetic element and arranged to be attracted by said fixed member when same is magnetized, one of said members being provided with a recess into which a portion of the other member is extended when said movable member is actuated, the shape of the last mentioned portion being defined by lines, angular with respect to each other and extending approximately longitudinally and transversely of said portion.

3. A device for actuating movable parts of pipe organs comprising an electro-magnetic element provided with a fixed member adapted to be magnetized on energization of the electro-magnetic element, a movable member located wholly outside of said electro-magnetic element and arranged to be attracted by said fixed member when same is magnetized, one of said members being provided with a recess into which a portion of the other member is extended when said movable member is actuated, the last mentioned portion being of the approximate shape of a frustum and said recess having a shape which corresponds approximately therewith.

4. A device for actuating movable parts of pipe organs comprising an electro-magnetic element provided with a fixed member adapted to be magnetized on energization of the electro-magnetic element, a movable member located wholly outside of said electro-magnetic element and movable in a straight line and arranged to be attracted by said fixed member when same is magnetized, one of said members being provided with a recess into which a portion of the other member is extended, when said movable member is actuated, the last mentioned portion being of the approximate shape of a frustum and said recess having a shape which corresponds approximately therewith.

5. A device for actuating movable parts of pipe organs comprising an electro-magnetic element provided with a fixed member extended outwardly beyond the electro-magnetic element and adapted to be magnetized on energization of the electro-magnetic element, a movable member located wholly outside of said electro-magnetic element and movable in a straight line, and arranged to be attracted by said fixed member when same is magnetized, one of said members being provided with a recess into which a portion of the other member is extended when said movable member is actuated, the shape of the last mentioned portion being defined by lines, one of which crosses the major axis of said portion.

In testimony whereof, we have hereunto set our hands.

HARRY F. WATERS.
VERNIE ROY BROWN.